(12) United States Patent
Adams et al.

(10) Patent No.: US 9,148,393 B2
(45) Date of Patent: Sep. 29, 2015

(54) SCHEDULING EVENTS FROM ELECTRONIC MESSAGES

(71) Applicant: BlackBerry Limited, Waterloo (CA)

(72) Inventors: Neil Patrick Adams, Waterloo (CA); Raymond Vander Veen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/862,012

(22) Filed: Apr. 12, 2013

(65) Prior Publication Data

US 2013/0239016 A1    Sep. 12, 2013

Related U.S. Application Data

(63) Continuation of application No. 11/461,626, filed on Aug. 1, 2006, now Pat. No. 8,429,292.

(60) Provisional application No. 60/719,966, filed on Sep. 26, 2005.

(51) Int. Cl.
| | |
|---|---|
| G06F 15/16 | (2006.01) |
| H04L 12/58 | (2006.01) |
| H04L 29/08 | (2006.01) |
| G06Q 10/10 | (2012.01) |
| H04M 1/725 | (2006.01) |
| H04W 4/00 | (2009.01) |
| H04W 4/12 | (2009.01) |
| H04W 72/12 | (2009.01) |
| H04W 84/12 | (2009.01) |
| H04W 88/02 | (2009.01) |

(52) U.S. Cl.
CPC .............. *H04L 51/04* (2013.01); *G06Q 10/107* (2013.01); *G06Q 10/109* (2013.01); *H04L 67/22* (2013.01); *H04M 1/72552* (2013.01); *H04M 1/72566* (2013.01); *H04W 4/00* (2013.01); *H04W 4/12* (2013.01); *H04W 72/12* (2013.01); *H04W 84/12* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 4,626,836 | A | * 12/1986 | Curtis et al. ................... | 345/156 |
| 5,732,399 | A | * 3/1998 | Katiyar et al. ............... | 705/7.18 |

(Continued)

FOREIGN PATENT DOCUMENTS

| | | |
|---|---|---|
| EP | 1 109121 | 6/2001 |
| JP | 11259568 | 9/1999 |

(Continued)

OTHER PUBLICATIONS

Outlook in a Nutshell 2000.*

(Continued)

*Primary Examiner* — Kristie Shingles
*Assistant Examiner* — Keyvan Emdadi
(74) *Attorney, Agent, or Firm* — Ridout & Maybee LLP (57) ABSTRACT

Scheduling an event on an electronic communications device configured for sending and receiving electronic messages over a communications network, including extracting information from an electronic message at the communications device; displaying on a display of the communications device an event scheduling interface for scheduling an event, the event scheduling interface having a plurality of input fields for receiving information about the event; and automatically populating at least one of the input fields in dependence on the extracted information.

17 Claims, 7 Drawing Sheets

(56) References Cited

U.S. PATENT DOCUMENTS

| | | | |
|---|---|---|---|
| 5,794,039 A * | 8/1998 | Guck | 1/1 |
| 5,946,647 A | 8/1999 | Miller et al. | |
| 6,016,478 A * | 1/2000 | Zhang et al. | 705/7.19 |
| 6,256,610 B1 * | 7/2001 | Baum | 704/260 |
| 6,505,167 B1 | 1/2003 | Horvitz et al. | |
| 6,807,566 B1 | 10/2004 | Bates et al. | |
| 6,813,777 B1 * | 11/2004 | Weinberger et al. | 725/76 |
| 6,983,310 B2 | 1/2006 | Rouse et al. | |
| 7,054,906 B2 * | 5/2006 | Levosky | 709/206 |
| 7,130,885 B2 * | 10/2006 | Chandra et al. | 709/206 |
| 7,325,019 B2 | 1/2008 | Lam et al. | |
| 7,428,000 B2 * | 9/2008 | Cutler et al. | 348/14.11 |
| 7,468,729 B1 | 12/2008 | Levinson | |
| 7,584,253 B2 | 9/2009 | Curbow et al. | |
| 8,429,292 B2 | 4/2013 | Adams et al. | |
| 2001/0049617 A1 * | 12/2001 | Berenson et al. | 705/8 |
| 2002/0026592 A1 | 2/2002 | Gavrila et al. | |
| 2002/0087641 A1 | 7/2002 | Levosky | |
| 2002/0099777 A1 | 7/2002 | Gupta et al. | |
| 2003/0018816 A1 | 1/2003 | Godfrey et al. | |
| 2003/0046423 A1 * | 3/2003 | Narad et al. | 709/238 |
| 2003/0051020 A1 | 3/2003 | Kadam et al. | |
| 2003/0069899 A1 | 4/2003 | Brown et al. | |
| 2003/0129569 A1 | 7/2003 | Callaway et al. | |
| 2003/0212680 A1 | 11/2003 | Bates et al. | |
| 2003/0217073 A1 | 11/2003 | Walther et al. | |
| 2004/0044644 A1 | 3/2004 | Brady et al. | |
| 2004/0199434 A1 | 10/2004 | Tanaka et al. | |
| 2004/0199663 A1 * | 10/2004 | Horvitz et al. | 709/238 |
| 2004/0243677 A1 * | 12/2004 | Curbow et al. | 709/206 |
| 2004/0263636 A1 * | 12/2004 | Cutler et al. | 348/211.12 |
| 2005/0021858 A1 | 1/2005 | Ruston et al. | |
| 2005/0086252 A1 | 4/2005 | Jones et al. | |
| 2005/0193073 A1 * | 9/2005 | Mehr et al. | 709/206 |
| 2007/0070940 A1 * | 3/2007 | Vander Veen et al. | 370/328 |
| 2007/0073810 A1 * | 3/2007 | Adams et al. | 709/205 |
| 2007/0079260 A1 | 4/2007 | Bhogal et al. | |
| 2007/0150513 A1 | 6/2007 | Vanden Heuvel et al. | |
| 2007/0226204 A1 | 9/2007 | Feldman | |
| 2008/0066018 A1 | 3/2008 | Zinn | |
| 2008/0134041 A1 * | 6/2008 | Zinn | 715/733 |

FOREIGN PATENT DOCUMENTS

| | | |
|---|---|---|
| WO | 99/07118 | 2/1999 |
| WO | 0122288 | 3/2001 |
| WO | 2004/029772 | 4/2004 |
| WO | 2005079336 | 9/2005 |
| WO | 2007121329 | 10/2007 |

OTHER PUBLICATIONS

PC Review—Jan. 19, 2004.*
PC Review Jan. 19, 2004.*
PC Review; Jan. 19, 2004.
Elaarag et al., "Web-based systems for communication and scheduling", IEEE International Professional Communication Conference, Sep. 21-24, 2003, pp. 201-208.
Mia K. Stern, "Dates and Times in Email Messages", IBM Research, Cambridge, MA, Jan. 13-16, 2004, Portugal.
Bonnie A. Nardi, et al., "Collaborative, Programmable Intelligent Agents", Apple Computer, Advanced Technology Group, Mar. 1998.
Smith M A et al, "Association for Computing Machinery: Visualization Components for Persistent Conversations" Chi 2001 Conference Proceedings. Conference on Human Factors in Computing Systems. Seattle WA, Mar. 31 to Apr. 5, 2001, New York, NY: IEEE, US.
Beard D. et al, "A Visual Calendar for Scheduling Group Meetings" Proceedings of Conference on Computer-Supported Cooperativework, Oct. 7-10, 1990, Los Angeles, New York, NY, US, Oct. 7, 1990, pp. 279-290, XP001013928.
International Search Report and Written Opinion issued in respect of corresponding PCT International Patent Application No. PCT/CA2006/001290.
Office Action dated Feb. 24, 2011, issued from the corresponding Canadian Patent Appln. No. 2,570,859.
Examination Report dated Oct. 30, 2012 issued for corresponding EP Application No. 06775072.9.
Office Action dated Mar 19, 2010, issued from the corresponding Canadian Patent Appln. No. 2,570,859.
Office Action dated Feb. 14, 2013, issued from the corresponding Canadian Patent Appln. No. 2,570,859.
Office Action dated Mar 26, 2012, issued from the corresponding Canadian Patent Appln. No. 2,570,859.
Office Action dated May 30, 2012, issued from the corresponding Canadian Patent Appln. No. 2,570,859.

* cited by examiner

From: D. Fox
Sent: December 22, 2003
To: A. Jones; B. Smith; C. Donald
Subject: RE: Budget Review It appears as though Alan's suggestion suits everyone. I'll schedule the meeting now for the main boardroom.

-------
From: A. Jones;
Sent: December 22, 2003
To: B. Smith; C. Donald; D. Fox
Subject: RE: Budget Review Hello everyone, I propose we meet January 1, at 3:00 pm.

Alan

-------
From: B. Smith;
Sent: December 22, 2003
To: A Jones; C. Donald; D. Fox
Subject: RE: Budget review I am not available until after December 28th. Anyone else?

Betty
-------
From: C. Donald
Sent: December 20, 2003
To: B. Smith; A. Jones; D. Fox
Subject: Budget review When is a good time for everyone to meet to review this year's budget? How about December 22 at 2:00 PM?

Charles

| MEETING REQUEST |
|---|
| Subject: Budget Review |
| Invited Attendees: B. Smith; A. Jones; D. Fox; C. Donald |
| Start Time: 3:00 PM     End Time: 4:00 PM |
| Date: Monday, January 1, 2005 |
| Organizer: A. Jones |
| Invited: D. Fox, B. Smith, C. Donald |
| Location: main boardroom |
| Notes:<br><br>From: D. Fox<br>Sent: December 22, 2003<br>To: A. Jones; B. Smith; C. Donald<br>Subject: RE: Budget Review<br><br>It appears as though Alan's suggestion suits everyone. I'll schedule the meeting now. |

Fig. 7

Fig. 8 ated on the communications device in an example embodiment;
SCHEDULING EVENTS FROM ELECTRONIC MESSAGES

CROSS REFERENCE TO RELATED APPLICATIONS

This application is a continuation of and incorporates by reference U.S. Pat. No. 8,429,292 filed on Aug. 1, 2006. This application claims priority to and incorporates by reference U.S. Provisional Patent Application No. 60/719,966 filed Sep. 26, 2005.

FIELD

Example embodiments described herein relate to communications devices and, in particular, to methods and systems for scheduling events on such devices.

BACKGROUND

Communications devices, in particular handheld mobile communications devices, are becoming increasingly sophisticated. A common feature of such communications devices is a system or application for scheduling events and setting reminders, i.e. a built-in calendar or events scheduler.

In a message, or during a message thread (such as an email thread) it is often decided that an event, such as a meeting or an appointment should be set up to, for example, discuss the matter at hand in more detail. Typically no one wants to set up the event, for example by creating a meeting request, because it is difficult and inconvenient to do so (especially on their handheld mobile communications device).

Creating an event such as a meeting involves entering all of the recipients of the message or message thread as attendees, entering the subject and notes, such as the content of the message or details about the meeting. In order to enter this information, a user will often have to switch back and forth between the email application and the calendar application. This can be particularly difficult when entering multiple attendees/recipients, as only one attendee can be selected at a time. The whole process can be very tedious, time-consuming and can lead to errors in the list of attendees, subject and notes. Moreover, because of the awkwardness of the process, a user may avoid setting up a meeting until they get back to their desktop computer. In the meantime, unnecessary delays are created in dealing with the matter at hand. The user may even forget to set up the event entirely.

BRIEF DESCRIPTION OF THE DRAWINGS

Example embodiments will now be described by way of example with reference to the accompanying drawings, through which like reference numerals are used to indicate similar features.

DETAILED DESCRIPTION

At least one example embodiment includes a method for scheduling an event on an electronic communications device configured for sending and receiving electronic messages over a communications network. The method includes extracting information from an electronic message at the communications device; displaying on a display of the communications device an event scheduling interface for scheduling an event, the event scheduling interface having a plurality of input fields for receiving information about the event; and automatically populating at least one of the input fields in dependence on the extracted information.

At least one example embodiment includes a communications device enabled to communicate over a communications network with other devices. The device includes a display; a user input device; a messaging module for exchanging electronic messages with other devices; a storage storing electronic messages sent or received by the device; and a scheduling module configured for displaying on the display an event scheduling interface for scheduling an event, the event scheduling interface having a plurality of input fields for receiving information about the event, the scheduling module being configured for automatically populating at least one of the input fields in dependence on information extracted from a selected electronic message stored in the storage.

At least one example embodiment includes a computer program product comprising a computer readable medium carrying computer executable instructions for scheduling an event on an electronic communications device configured for sending and receiving electronic messages over a communications network, the instructions including instructions for: extracting information from an electronic message at the communications device; displaying on a display of the communications device an event scheduling interface for scheduling an event, the event scheduling interface having a plurality of input fields for receiving information about the event; and automatically populating at least one of the input fields in dependence on the extracted information.

The following description of one or more specific embodiments does not limit the implementation of the invention to any particular computer programming language, operating system, system architecture or device architecture. Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions, and other devices.

Figure 1:
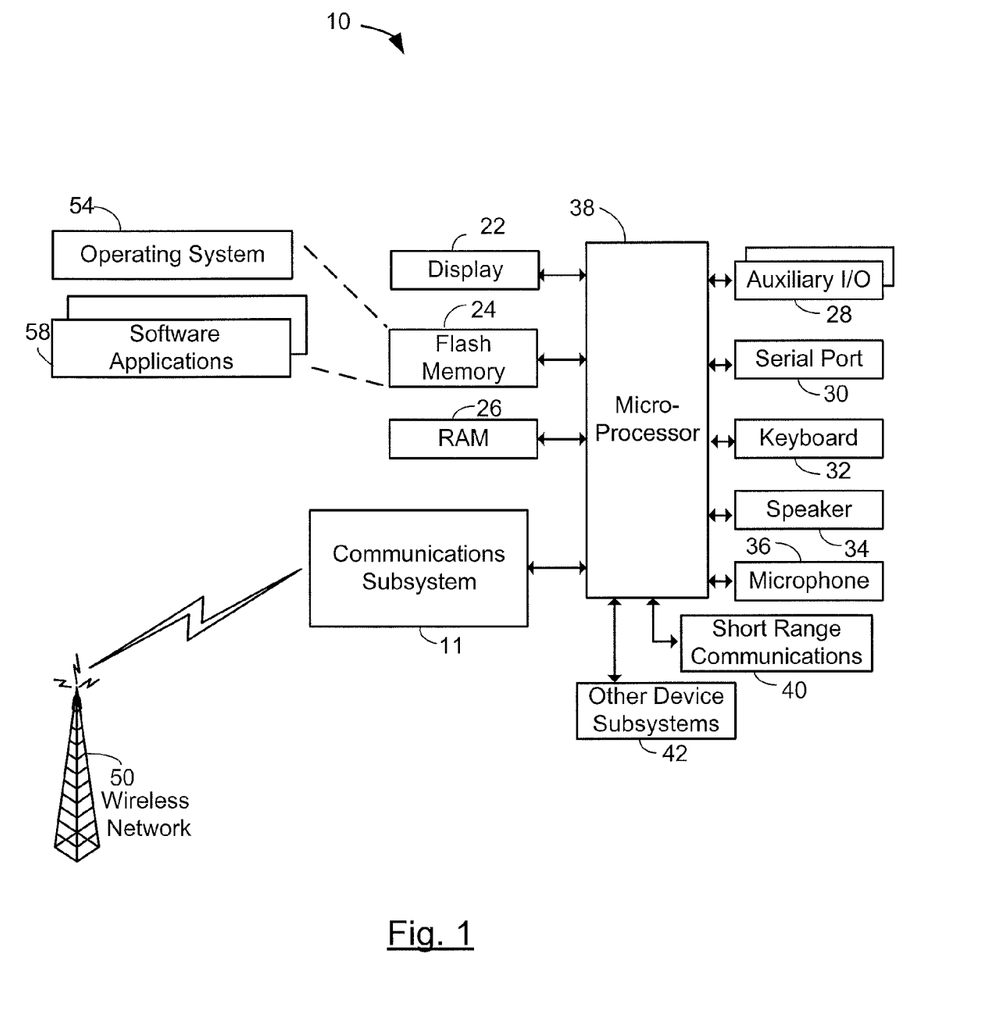
FIG. 1 shows a block diagram of an example of a mobile communications device to which example embodiments of an event scheduler can be applied.

Referring now to the drawings, FIG. 1 is a block diagram showing an example of an electronic communications device 10 to which example embodiments of the event scheduler described herein can be applied. The communications device 10 is a two-way mobile communication device having voice and messaging communications capabilities. Depending on the functionality provided by the device 10, in various embodiments the device 10 may be a data communication device, a multiple-mode communication device configured for both data and voice communication, a mobile telephone, a PDA enabled for wireless communication, a computer system with a wireless modem or wireless network card, or a computer or phone device with a fixed connection to a network, among other things. The device 10 may be a handheld device.

In the example embodiment shown in FIG. 1, the device 10 includes a communication subsystem 11. The communication subsystem 11 may include one or more receivers, transmitters, and associated components such as one or more antenna elements, and a processing module such as a digital signal processor (DSP). As will be apparent to those skilled in the field of communications, the particular design of the communication subsystem 11 will be dependent upon the communication network(s) in which the device 10 is intended to operate.

Signals received by the device 10 from a wireless communication network 50 are input to the receiver of the communication subsystem 11, which may perform such common receiver functions as signal amplification, frequency down conversion, filtering, channel selection and the like. In a similar manner, signals to be transmitted are processed, including modulation and encoding for example, by the DSP and input to the transmitter for digital to analog conversion, frequency up conversion, filtering, amplification and transmission over the wireless communication network 50.

The device 10 includes a microprocessor 38 that controls the overall operation of the device. The microprocessor 38 interacts with the communications subsystem 11 and also interacts with further device subsystems such as a display 22, flash memory 24, random access memory (RAM) 26, one or more auxiliary input/output (I/O) subsystems or devices 28 (e.g. a thumbwheel 28a), serial port 30, keyboard or keypad 32, speaker 34, microphone 36, a short-range communications subsystem 40, and any other device subsystems generally designated as 42.

Figure 2:
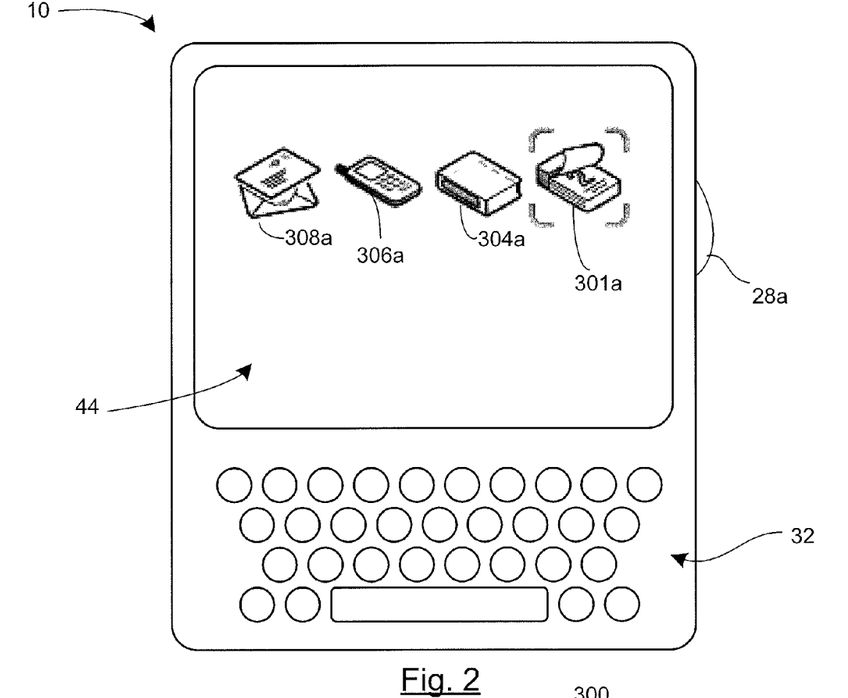
FIG. 2 shows, in diagrammatic form, a front view of an example of the device of FIG. 1.

FIG. 2 shows, in diagrammatic form, a front view of an example handheld embodiment of the device 10 of FIG. 1. The device 10 includes a display screen 44 of the display 22, alphanumeric keyboard or keypad 32 and thumbwheel 28a.

Referring again to FIG. 1, operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, in example embodiments enables execution of software applications 58 on the device. A predetermined set of software applications 58 which control basic device operations, including data and voice communication applications for example, will normally be installed on the device 10 during manufacture. Further software applications 58 may also be loaded onto the device 10 through the wireless communication network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which further process the received signal for output to the display 22 through the graphics subsystem 44, or alternatively to an auxiliary I/O device 28. A user of device 10 may also compose data items within a software application 58, such as email messages and calendar entries for example, using the keyboard 32 in conjunction with the display 22 and possibly an auxiliary I/O device 28 (e.g. the thumbwheel 28a). Such composed items may then be transmitted and received over a communication network through the communication subsystem 11.

The serial port 30 (which may be for example a universal serial bus (USB) port) in FIG. 1 may enable a user to set preferences through an external device or software application and would extend the capabilities of the device by providing for information or software downloads to the device 10 other than through a wireless communication network.

The short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

Wireless communication network 50 is, in an example embodiment, a wireless wide area packet data network, (e.g. Mobitex™ or DataTAC™), which provides radio coverage to mobile devices 10. Wireless communication network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). In some example embodiments, network 50 is a wireless local area network (WLAN), such as for example a network compliant with one or more of the IEEE 802.11 family of standards. In some example embodiments, the device 10 is configured to communicate in both data and voice modes over both wireless WAN and WLAN networks and to roam between such networks.

Figure 3:
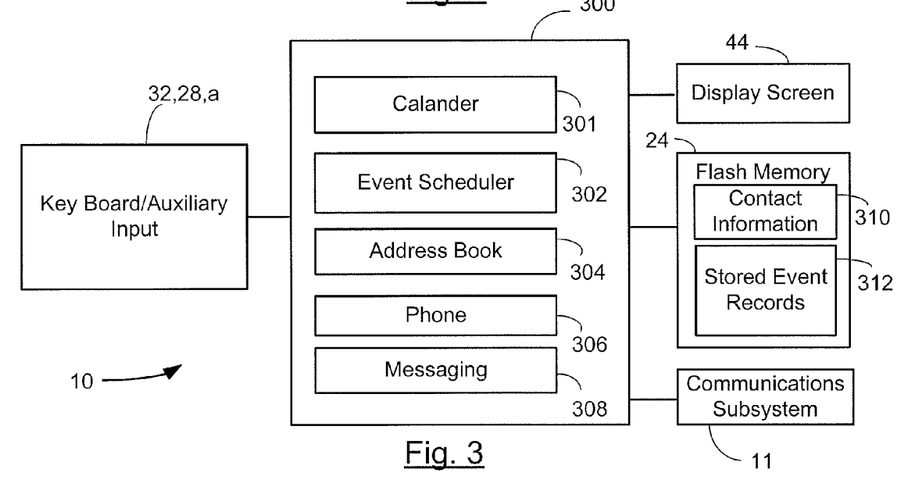
FIG. 3 shows a further operational block diagram representation of the mobile communications device of FIG. 1.

Under instructions from various software applications 58 resident on the device 10, the processor 38 is configured to implement various functional components or modules 300, some of which are represented in FIG. 3, for interacting with the device subsystems described above. In an example embodiment, the software resident on the device 10 includes applications for implementing an event scheduler 302, an address book 304, a telephone 306, and email and/or instant text messaging 308. In some embodiments, some or part of the functionality of the functional modules 300 can be implemented through firmware or hardware components instead of, or in combination with, computer software instructions executed by the microprocessor 38 (or other processors).

The event scheduler 302 is provided for facilitating the scheduling of events based upon the content of a received message, such as an email or instant text message. The messaging module 308 enables the device 10 to send and receive messages, such as email messages, over one or more wireless networks 50.

It should be noted that the term "message" is used to designate any type of electronic message such as an email (which may include a thread of emails), text or SMS message, instant message, etc. Likewise, the term "event" is used to designate any type of event, such as an appointment, a meeting, a conference call, a scheduled task etc.

The event scheduler 302 may be implemented as part of an electronic messaging application, such as messaging module 308 or as part of a general event scheduling application, such as calendar 301. Alternatively, the event scheduler 302 may be implemented as an independent application that communicates with an electronic messaging application and/or a general event scheduling application. The use of calendar applications and electronic messaging applications on PDA-type devices and personal computers to schedule appointments, meetings and the like is common place.

The address book 304 enables contact information, such as telephone numbers and email and/or instant text messaging addresses, to be stored and accessed on the device 10. The messaging module 308 enables the device 10 to transmit and receive messages over one or more wireless networks 50.

With reference to FIG. 2, in at least some example embodiments, the modules 300 each have an associated selectable icon that is displayed on the screen 44 as part of a graphical user interface. For example, FIG. 2 shows an icon 301a for calendar 301, an icon 304a for address book 304, an icon 306a for phone 306 and an icon 308a for electronic messaging 308.

According to example embodiments of the invention, the event scheduler 302 permits a user of the device 10 to set up or schedule an event based upon information in a received message (e.g. email, instant text message, or the like). The event scheduler 302 will automatically fill in details of the event that are contained in the message itself, as will be described in more detail below.

Figure 4A:
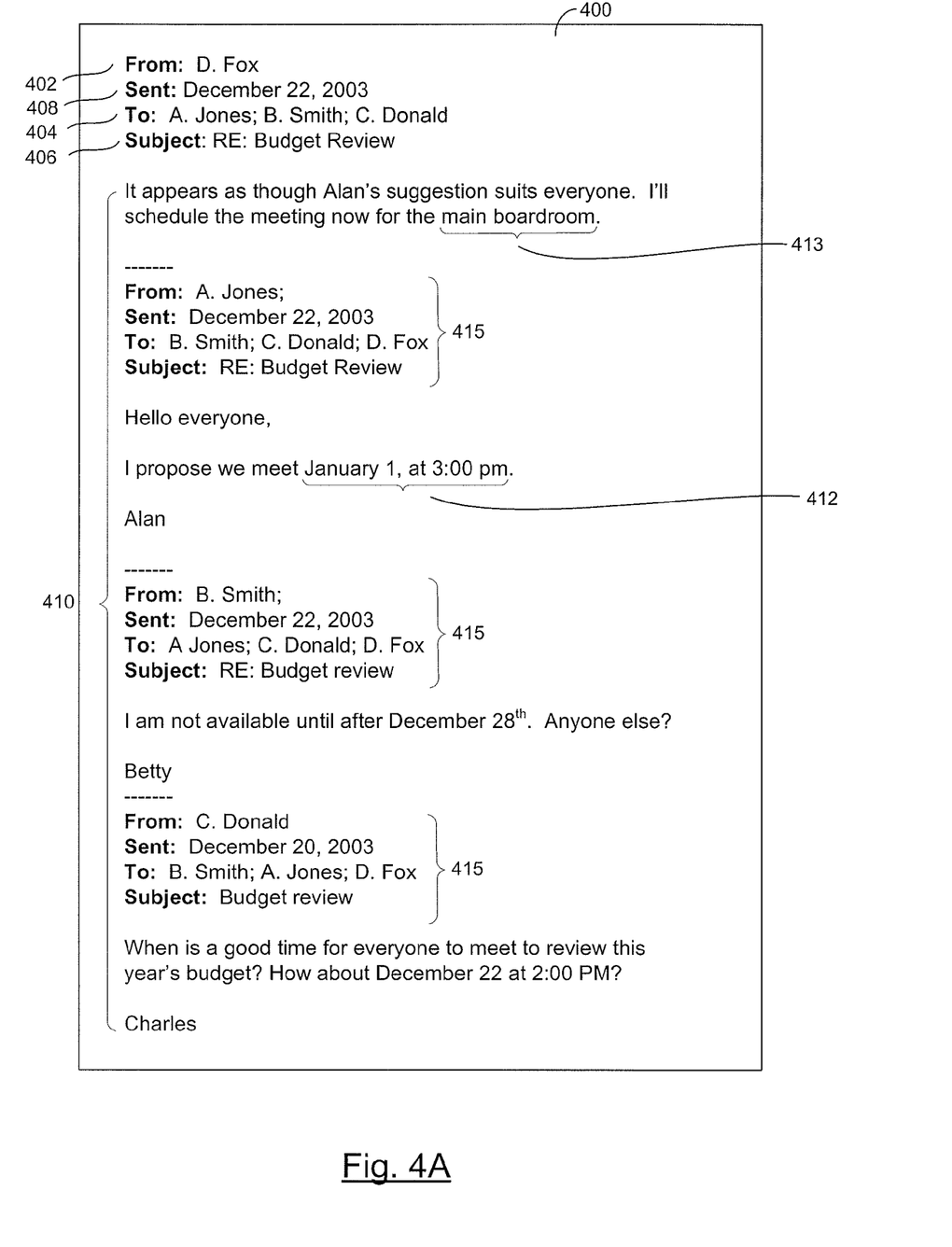
FIG. 4A shows a diagrammatic view of an electronic mail message graphical user interface screen.

In this regard, reference is now made to FIG. 4A that shows, in diagrammatic form, an illustrative email message 400 generated on display screen 44. It should be noted that an email message is used by way of example only as the message could be any type of message, as described previously. The message 400 may be displayed on screen 44 in response to user selection of an email message from a list of messages maintained by messaging module 308 or in response to other activity at device 10. In an example embodiment, part of or the entire message 400 is stored in a storage of the device 10, for example, in flash memory 24 or RAM 26. It should be noted that due to the size of a typical screen 44, the entire message (particularly in the case of a long email thread) would not be shown in a single screen shot. The user would be able to scroll through the message via the keyboard and/or an auxiliary input device such as the thumbwheel 28a.

Figure 4B:
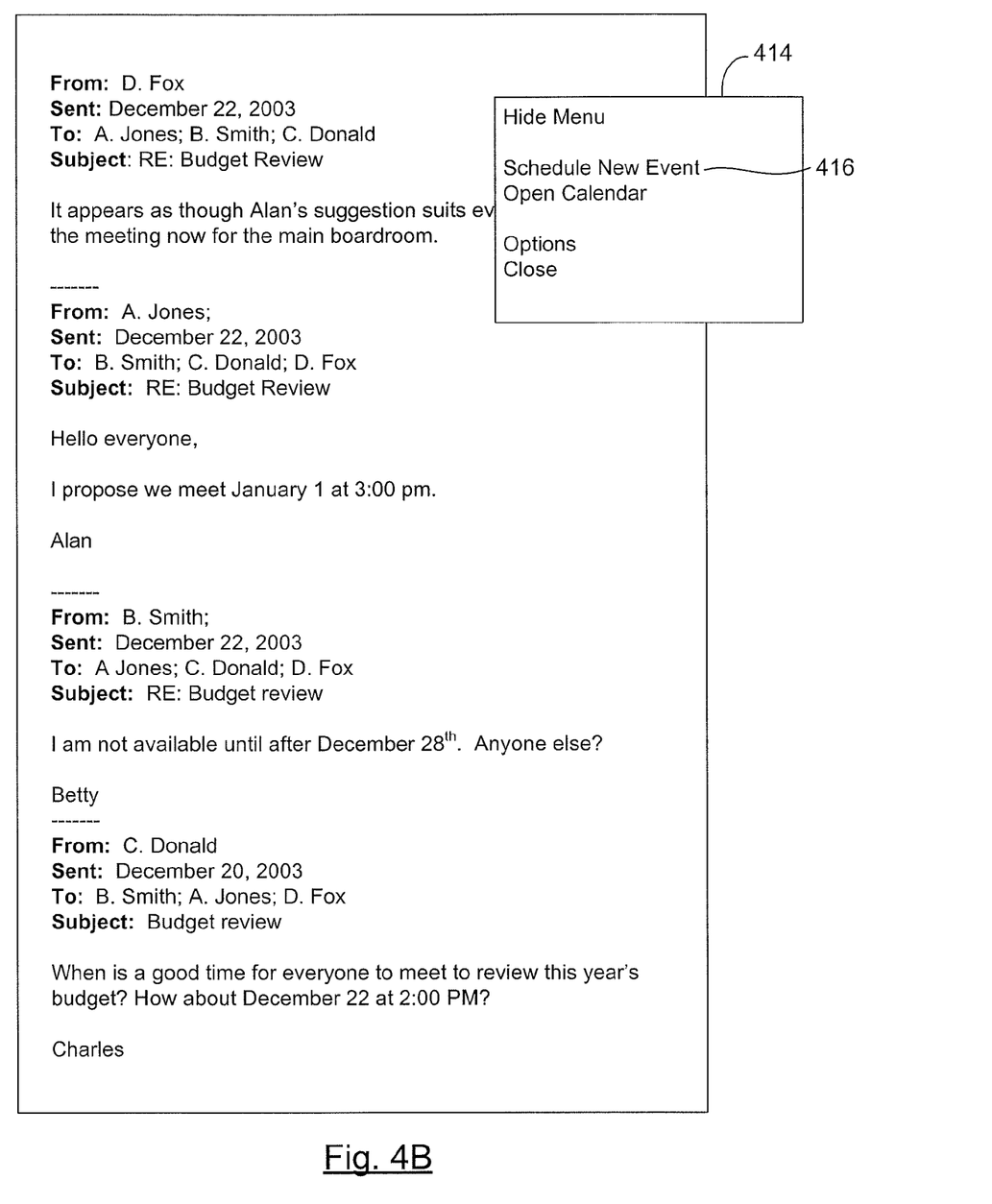
FIG. 4B shows a diagrammatic view of an electronic mail message graphical user interface screen with an additional menu for scheduling an event.

The message 400 includes various fields such as the sender name 402, the list of recipients 404, the subject of the message 406, the date and/or time the message was sent 408 and the message body 410. In an example embodiment, embedded within the message body is date and time information 412 for an event (a meeting in the illustrated example) and location information 4B for the event. The user may prompt the display of a menu 414, as shown in FIG. 4B, via the keyboard and/or an auxiliary input device such as thumbwheel 28a. This menu 414 may comprise a plurality of selectable items, including a "Schedule New Event" item 416. It should be noted that the list of recipients 404 may include one or more recipients, one or more groups of recipients or a combination thereof.

Figure 5A:
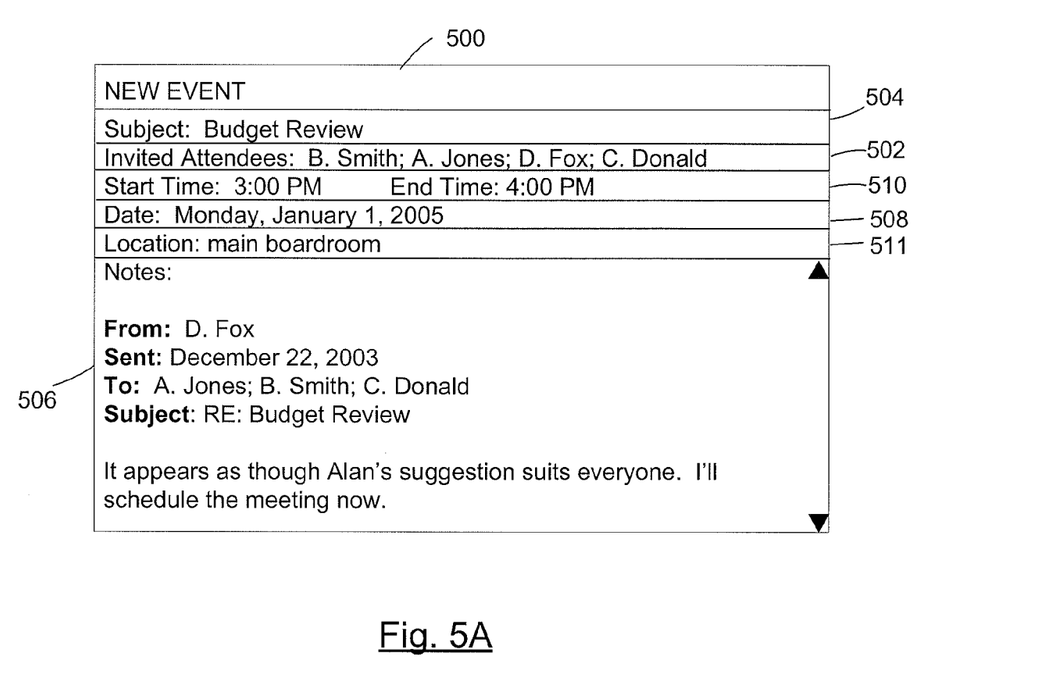
FIG. 5A shows a diagrammatic view of a user interface screen for creating a new event generated on a display of communications device in an example embodiment.

Selection of the "Schedule New Event" item 416 generates a new event scheduling interface 500 on display screen 44, as shown in FIG. 5A, for scheduling an event associated with the electronic message 400. This new event scheduling interface 500 includes a number of fields for inputting information about the event, such as an invited attendee field 502, a subject field 504, a notes field 506, an event date field 508, an event time field 510, and an event location field 511. The event scheduler 302 will automatically populate the fields of the New Event scheduling interface 500 in dependence on information extracted from the email message, For example, information from the list of recipients 404, the subject 406, the entire text of the message body 410, and information from within the message body such as the first occurring date and time text 412, and location information 413 may be extracted. The event scheduler 302 may also extract additional information such as the importance of the message, the attachments and the names of the attachments. Once a user confirms the content of the fields of the event scheduling interface 500, a corresponding event record 312 (see FIG. 3) is stored in the flash memory 24

In at least some example embodiments, the invited attendees field 502 will be automatically populated from recipients identified in the list of recipients field 404 of the electronic mail message and with the sender identified in the sender field 402. Optionally, certain recipients may be omitted from the invited attendees field 502, for example the recipients who were only copied on the message would be omitted and the attendees field would only be populated with the one or more direct recipients. The subject field 504 will be automatically populated with text extracted from the subject field 406 of the message 400. Optionally, the "Re:" or "Fw:" strings may be removed from the subject text. In an example embodiment, the notes field 506 will be automatically populated with the entire content of the message body 410. In some applications, the notes field 506 can be left blank or automatically populated with only a portion of the message body (for example, up to a threshold number of characters in the message body, starting from the beginning of the message). The notes field 506 may also be automatically populated with the attachments and/or the names of the attachments. It should be noted that due to the size of a typical screen 44, the entire message body (particularly in the case of a long email thread) would not be shown simultaneously on the screen 44 of the device in the notes field 506. The user would be able to scroll through the notes field 506 via the keyboard and/or an auxiliary input device such as the thumbwheel 28a.

In an example embodiment, the event scheduler 302 is configured to scan the text of at least the message body 410 for date and time information to populate the date and time fields 508, 510. In particular the event scheduler 302 is configured to look for predetermined character strings that are typically associated with date and time (for example names of months and/or days, and number/character strings associated with a clock time such *:**, where * is a numeric character). As is apparent from FIG. 4A, in the case of an ongoing email thread, the message body 410 includes a number of email messages, including header information 415 from previous emails. This header information 415 includes sent/and or received date/time information for the previous emails in the thread. In an example embodiment, the event scheduler 302 is configured recognize date/time information contained in email headers 415 embedded in the message body and ignore such information. Thus, in at least one example embodiment, scanning is limited to the message body 410 with embedded header information, including the sent/received date/time field of previous messages in a thread being ignored.

In one configuration, the date field 508 and time field 510 of event record 500 will be automatically populated with the first date and time characters 412 found in the message body 410 (ignoring embedded header information), scanning from beginning to end of the message body. For example, with reference to FIG. 4A, if "January 1 at 3:00 pm" was found in the body of the message before any other date/time information, the date field 508 and the time field 510 would automatically be populated with the date "January 1" and the start time "3:00 pm", respectively. In the illustrated example, the time field 510 includes both start time and end time sub-fields, and a configurable and editable default duration of 1 hour is applied, resulting in an end time of 4:00 pm. In some embodiments, the event scheduler is configured to look for strings in a the message body that denote either an end time or duration of the meeting and use such information to populate the "End Time" sub field. As message threads are typically arranged in reverse chronological order (most recent to oldest), scanning from beginning to end of the message body will typically capture the most recent proposed time information.

It should be understood that while in the above description, the event scheduler 302 will extract from the email message the first occurring date and time text 412, the event scheduler 302 may alternatively be configured to extract date and time text according to other predetermined criteria, for example the date and time text that is closest a particular word (e.g. "confirm"). In some embodiments, a number of occurrences of date and time text may be extracted from the message body as different selection options, and the user given the opportunity to scroll through and select from the different selection options. In some embodiments, the subject field 406 of email 400 and the subject fields in the header information 415 of messages within the thread contained in the message body 410 are included in the scan with information contained therein being given alternatively higher or lower priority than information in the message body, according to preconfigured ranking criteria applied by the event scheduler 302.

In a message, it is unlikely that reference will be made to the year. The date field will automatically be populated with a default value, for example the current year. Similarly, if the date and/or time are not found in the message body 410, or if other information is not found in the message, the corresponding record fields will automatically be populated with default values, for example, in the case of the date/time fields, 12:00 pm or the current date and/or time information. Of course, the user may manually enter any missing information, as will be described in more detail below. If the user does not enter all of the necessary information, they may be prompted to do so.

In an example embodiment, the event scheduler 302 scans the message body 410 (and in some configurations, the subject field 406) for location information 413 to extract and the location field 511 of the event scheduling interface 500 may be automatically populated with such location information. In such embodiments, the event scheduler 302 is configured to look for predetermined text strings that denote location information (for example "main boardroom"; or "room *" where * is a wild character, etc.), and extract the relevant location information. In the illustrated embodiment, the location information 413 that is extracted is the location "main boardroom".

It will be appreciated that additional automatically populating fields could be included in the event scheduling interface 500. Similarly, the new event record may not include all of the fields mentioned above.

Figure 5B:
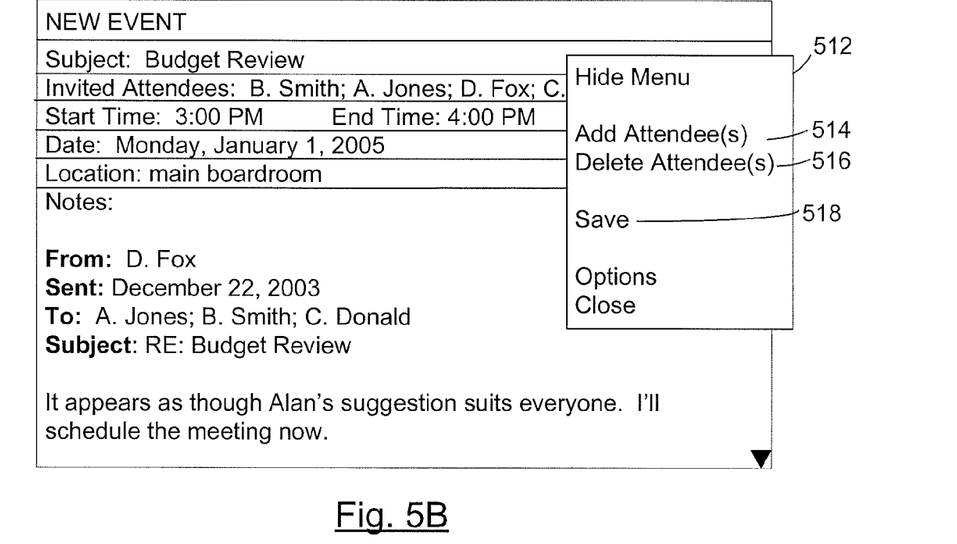
FIG. 5B shows a diagrammatic view of a new event entry screen with an additional menu for editing attendees generated on the communications device in an example embodiment.

A user of device 10 may scroll through the displayed fields of the new event scheduling interface 500 on device display screen 44 and edit various fields. For example, by selecting the invited attendees field 502, a user may add or delete invited attendees. In order to add or delete invited attendees, the user may prompt the display of another menu 512, as shown in FIG. 5B, via the keyboard and/or an auxiliary input device such as thumbwheel 28a. This menu 512 may comprise a plurality of selectable items, including a "Add Attendee" item 514 and a "Delete Attendee" item 516. Selection of the "Add Attendee" item 514 may prompt the display of a further menu (not shown) which would allow the user to select the name of an attendee from the address book 304. Once the name of the attendee has been selected, the invited attendee field is automatically populated. Alternatively, the user may enter additional attendees names manually and these names will be automatically associated with their address/phone number. If the contact details of the additional attendee(s) are not stored in the address book 304, the user may enter this information manually as well. In some embodiments, the stored contact information database 310 is stored locally in a storage such as flash memory 24 of the device and periodically synchronized with an address book maintained at a personal computer of the user. In other embodiments, the stored contact information may be retrieved from a remote server or computer over wireless network 50 as part of the lookup function.

In order to delete one or more attendees, the user may select the one or more attendees by scrolling through the attendees via the keyboard and/or an auxiliary input device such as thumbwheel 28a. Once the selection is made, the user may prompt the display of the menu 512 in order to delete the selected attendees.

The user can also scroll through and edit the subject, time, date and location fields 504, 510, 508 and 511 using the keyboard and/or an auxiliary input device such as thumbwheel 28a. The user may also scroll through the notes field using the keyboard and/or an auxiliary input device such as thumbwheel 28a, particularly if the message body contains a long email or email thread.

Figure 6:
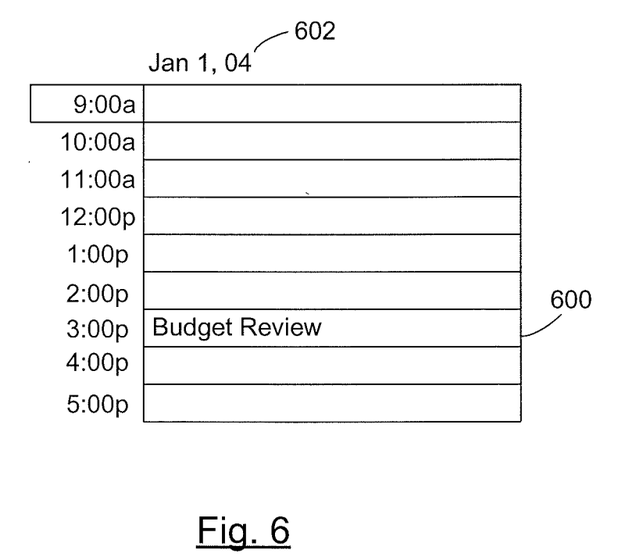
FIG. 6 shows a diagrammatic view of a user interface screen for scheduling generated on the communications device in an example embodiment.
Figure 7:
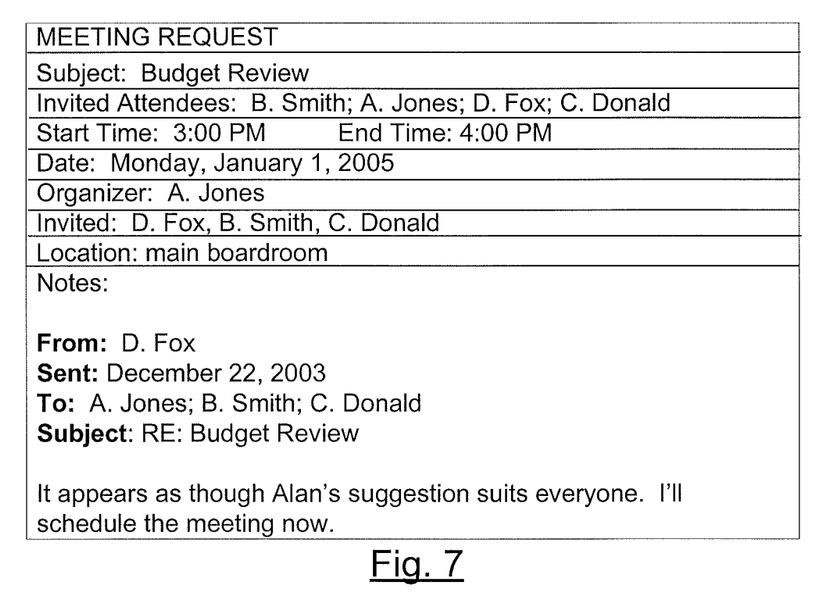
FIG. 7 shows a diagrammatic view of a meeting request screen generated on the communications device in an example embodiment.

Once the user is satisfied with the information included in the new event scheduling interface 500, the user can select a "Save" selection 518 from menu 512 (FIG. 5B), which in an example embodiment (i) causes the information in the fields of the interface 500 to be saved as stored event record 312 in a storage of or accessible to the mobile device 10; and (ii) causes the messaging module 308 to send an electronic event notification that includes at least some of the information contained in the fields of the event scheduler interface 500 to the listed invitees. Once the information has been saved, the new event will appear as a calendar entry 600 for the date 602 (which corresponds to the date shown in date field 508), as shown in FIG. 6, which can be called up for viewing and, in some cases, editing or cancellation. In an example embodiment, the sent electronic event notification is sent to the invitees as a meeting request, as shown in FIG. 7, whereby each of the recipients will be able to either accept or decline the event.

In at least one example embodiment, the event scheduler 302 and/or calendar 301 will generally attempt to generate a prompt or reminder at the time and date set in the time and date fields 610 and 608, respectively. However, the user may request that a reminder be generated at a set duration prior to the scheduled event.

Figure 8:
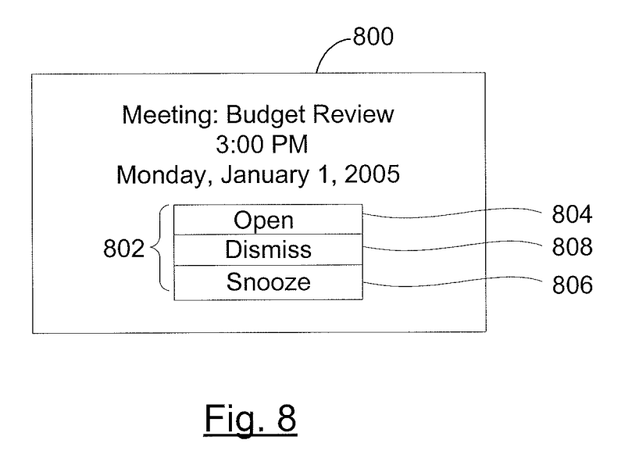
FIG. 8 shows a diagrammatic view of a reminder screen generated on the communications device in an example embodiment.

For example, when the time for a scheduled event occurs, the event scheduler and/or calendar 301 causes an event reminder dialog box to be displayed on screen 44. An example of such an event reminder dialog box 800 is shown in FIG. 8 comprising a plurality of buttons 802. The plurality of buttons 802 comprises a open button 804 (designated by "Open") for viewing the details of the scheduled phone call in an interface screen similar to the new event graphical user interface screen 500, a defer button 806 (designated by "Snooze") for deferring the reminder to a new time and date and a dismiss button 808 (designated by "Dismiss") for dismissing the reminder.

The above-listed names for each of the plurality of buttons 802 are intended as examples, and the skilled person will understand that any reasonable name could be used. Likewise, any suitable combination of buttons may be used. Moreover, the plurality of buttons may be replaced with any suitable user interface. As indicated in FIG. 8, the information from the subject field 504 is shown in the dialog box 800, along with the scheduled date and time of the event. In some embodiments, if the device 10 is turned off when the scheduled time occurs, the reminder dialog box 800 is displayed the next time the device is activated. Similarly, in some embodiments, if the device 10 is in a locked or inactive state when the scheduled time occurs, the reminder dialog box 800 is displayed when the user next unlocks or activates the device.

The user may select one of the plurality of buttons displayed in dialog box 800 using an auxiliary I/O device 28 such as, for example, the thumbwheel 28a, or the keyboard 32 in conjunction with the display 22.

If the user selects the open button 804, the device 10 will display the details of the event in an interface screen similar to the new event graphical user interface screen 500 which presents the information previously entered and/or extracted from the message (as described above). If the defer button 806 is selected, the device 10 will exit the dialog box 800 and defer the display of the reminder dialog box 800 to a specified time and/or date. Optionally, the device 10 will present a further date and time field for entry of this specified time and/or date. If the dismiss button 808 is selected, the device 10 will simply exit the reminder dialog box 800.

It should be understood that while in the above description, the entering of information, selection of items, and the like is performed using the device 10, it is equally possibly these tasks be performed using a computer, for example a desktop computer, in communication with the device 10. Furthermore, the event scheduling described herein can be applied to communications devices other than mobile devices, including stationary computers that are configured to send and receive messages over a network.

While the invention has been described in detail in the foregoing specification, it will be understood by those skilled in the art that variations may be made without departing from the scope of the invention, being limited only by the appended claims.

What is claimed is:

1. A method performed by a computing device, the method comprising operations of:
   presenting a first electronic message that contains a threaded message including contents of a second electronic message and a header portion for the second electronic message in a body of the first electronic message;
   during the presenting, receiving a selection for invoking a user interface for a calendar event;
   processing the body of the first electronic message to identify a date related to the calendar event, while ignoring any other date contained in the header portion of the second electronic message;
   displaying the user interface for the calendar event, the user interface configured with input fields to receive information about the calendar event,
   and populating, concurrently with the displaying operation, at least one of a day and a time associated with the identified date into an input field of the user interface.

2. The method of claim 1 wherein the processing operation comprises: distinguishing the header portion of the second electronic message from other information in the body of the first electronic message; and determining the identified date from the other information in the body of the first electronic message after the distinguishing.

3. The method of claim 1 wherein populating further comprises:
   identifying, in the header portion of the second electronic message, a recipient of the threaded message; and
   including, in an attendee input field of the user interface, the recipient from the identifying as an invitee to the calendar event.

4. The method of claim 1 wherein populating further comprises:
   identifying location information in the body of the first electronic message; and
   including the location information in a location input field of the user interface.

5. A computing device comprising:
   an interface device configured to present a first electronic message that contains a threaded message including contents of a second electronic message and a header portion for the second electronic message in a body of the first electronic message, and configured to, while the electronic message is presented, receive a selection for invoking a user interface for a calendar event;
   a processor configured to process the body of the first electronic message to identify a other date related to the calendar event, while ignoring any other date contained in the header portion of the second electronic message;
   a display configured to show the user interface for the calendar event, the user interface including input fields to receive information about the calendar event, and
   the processor being further configured to cause population, concurrently with showing the user interface, of at least one of a day and a time associated with the identified date into an input field of the user interface.

6. The device of claim 5 wherein the processor is configured to process the body of the first electronic message by: distinguishing the header portion of the second electronic message from other information in the body of the first electronic message; and determining the identified date from the other information in the body of the first electronic message after the distinguishing.

7. The device of claim 5 wherein the processor is further configured to perform the population by:
   identifying, in the header portion of the second electronic message, a recipient of the threaded message; and
   including, in an attendee input field of the user interface, the recipient from the identifying as an invitee to the calendar event.

8. The device of claim 5 wherein the processor is further configured to perform the population by:
   identifying location information in the body of the first electronic message; and including the location information in a location input field of the user interface.

9. A server computer comprising:
a transceiver configured to communicate a first electronic message to a communications device for presentation of the first electronic message that contains a threaded message including contents of a second electronic message and a header portion for the second electronic message in a body of the first electronic message, and configured to, during presentation of the first electronic message, receive a selection for invoking a user interface for a calendar event;
a processor configured to process the body of the first electronic message to identify a date related to the calendar event, while ignoring any other date contained in the header portion of the second electronic message;
the processor being configured to cause the communications device to display the user interface for the calendar event, the user interface including input fields to receive information about the calendar event;
the processor being further configured to cause population of at least one of a day and a time associated with the identified date into an input field of the user interface.

10. The server computer of claim 9 wherein the processor is further configured to process the body of the first electronic message by: distinguishing the header portion of the contents of the second electronic message from other information in the body of the first electronic message; and
extracting the identified date from the other information in the body of the first electronic message after the distinguishing.

11. The server computer of claim 9 wherein the processor is further configured to cause the population by:
identifying in the header portion of the second electronic message a recipient of the threaded message; and
including, in an attendee input field of the user interface, the recipient from the identifying as an invitee to the calendar event.

12. The server computer of claim 9 wherein the identified date is identified based on at least one of a keyword, and a textual proximity of the identified date to the keyword.

13. The server computer of claim 12 wherein the keyword contains 'meet' as a string.

14. The server computer of claim 9 wherein the processor is further configured to cause the population by:
identifying location information in the body of the first electronic message; and
including the location information in a location input field of the user interface.

15. The method of claim 1 wherein a plurality of dates related to the calendar event is identified, further comprising: displaying a selectable list of the plurality of dates; and populating at least one of a day and a time associated with a selected date, selected from the selectable list, into the input field of the user interface.

16. The device of claim 5 wherein a plurality of dates related to the calendar event is identified, wherein the processor is further configured to: cause the display to display a selectable list of the plurality of dates; and populate at least one of a day and a time associated with a selected date, selected from the selectable list, into the input field of the user interface.

17. The server computer of claim 9 wherein a plurality of dates related to the calendar event is identified, wherein the processor is further configured to: cause the communications device to display a selectable list of the plurality of dates; and populate at least one of a day and a time associated with a selected date, selected from the selectable list, into the input field of the user interface.

* * * * *